United States Patent
Birk et al.

(10) Patent No.: US 8,319,970 B2
(45) Date of Patent: Nov. 27, 2012

(54) DEVICE AND METHOD FOR BEAM ADJUSTMENT IN AN OPTICAL BEAM PATH

(75) Inventors: Holger Birk, Meckesheim (DE); Marcus Dyba, Mannheim (DE); Hilmar Gugel, Dossenheim (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 428 days.

(21) Appl. No.: 12/073,360

(22) Filed: Mar. 4, 2008

(65) Prior Publication Data
US 2008/0316469 A1   Dec. 25, 2008

Related U.S. Application Data

(60) Provisional application No. 60/894,762, filed on Mar. 14, 2007.

(30) Foreign Application Priority Data

Mar. 6, 2007 (DE) .................. 10 2007 011 305

(51) Int. Cl.
*G01N 21/55* (2006.01)
(52) U.S. Cl. ..................... 356/445; 356/243.1
(58) Field of Classification Search ............... 250/201.3, 250/235, 559.1, 578.1, 341.5; 356/228, 73, 356/446, 243.1–234.8, 247–256, 445; 362/233; 359/381, 384–390, 399
See application file for complete search history.

(56) References Cited

U.S. PATENT DOCUMENTS

| | | | |
|---|---|---|---|
| 4,662,745 A | 5/1987 | Zupanick et al. | |
| 4,945,220 A * | 7/1990 | Mallory et al. | 250/201.3 |
| 5,731,588 A | 3/1998 | Hell et al. | |
| 6,355,919 B1 | 3/2002 | Engelhardt | |
| 6,859,313 B2 | 2/2005 | Iketaki et al. | |
| 6,879,440 B2 * | 4/2005 | Cemic et al. | 359/385 |
| 6,914,236 B2 * | 7/2005 | Hoffmann | 250/234 |
| 7,064,824 B2 | 6/2006 | Hell | |
| 7,274,506 B2 * | 9/2007 | Engelhardt | 359/370 |
| 7,488,924 B2 * | 2/2009 | Bublitz et al. | 250/201.3 |
| 2001/0022341 A1 | 9/2001 | Adachi et al. | |
| 2002/0020800 A1 * | 2/2002 | Knebel et al. | 250/201.3 |
| 2003/0142399 A1 * | 7/2003 | Schoeppe | 359/385 |
| 2005/0264875 A1 | 12/2005 | Engelhardt | |

FOREIGN PATENT DOCUMENTS

DE   26 33 965 A1   2/1978

(Continued)

*Primary Examiner* — Tarifur Chowdhury
*Assistant Examiner* — Michael P Lapage
(74) *Attorney, Agent, or Firm* — Foley & Lardner LLP

(57) ABSTRACT

A device for beam adjustment in an optical beam path, having at least two mutually independent light sources providing respective beams of a high or extremely high resolution microscope, the beams of the light sources superposed in a common illumination beam path. The device includes a calibration sample with the aid of which the pupil position and/or focal position of the beams can be checked. The device also includes a sample holder arranged to bring the calibration sample into and out of the common illumination beam path at the site or in the vicinity of an intermediate image. A corresponding method is described. In accordance with the device and method, it is possible to undertake the beam adjustment independently of the actual use, that is to say, in the case of a high resolution microscope, independently of the examination sample and/or the recording of images.

21 Claims, 3 Drawing Sheets

FOREIGN PATENT DOCUMENTS

| | | |
|---|---|---|
| DE | 197 32 668 A1 | 2/1999 |
| DE | 102 33 074 A1 | 2/2004 |
| EP | 0 491 289 B1 | 6/1992 |
| EP | 0 801 759 B1 | 10/1997 |
| WO | WO 99/42885 A2 | 8/1999 |
| WO | WO 2004/090617 A2 | 10/2004 |
| WO | WO2004/097493 * | 11/2004 |
| WO | WO 2006/127692 A2 | 11/2006 |

* cited by examiner

DEVICE AND METHOD FOR BEAM ADJUSTMENT IN AN OPTICAL BEAM PATH

CROSS-REFERENCE TO RELATED PATENT APPLICATIONS

Germany Priority Application 10 2007 011 305.8, filed Mar. 6, 2007 including the specification, drawings, claims and abstract, is incorporated herein by reference in its entirety. This application claims priority from Provisional Application U.S. Application 60/894,762, filed Mar. 14, 2007, incorporated herein by reference in its entirety.

BACKGROUND OF THE INVENTION

The invention relates to a device for beam adjustment in an optical beam path having at least two mutually independent light sources, in particular in a beam path of a preferably high or extremely high resolution microscope, the beams of the light sources requiring to be superposed in a common illumination beam path.

Furthermore, the invention relates to a corresponding method, in particular for applying the inventive device.

Generically determinative devices with the aid of which the light from at least two mutually independent light sources is united in a common beam path are known from practice. It is usual there to adjust the beam position by using the beams to be superposed in order to image a sample with exceptionally small structures. Use is made to this end of, inter alia, so-called beads that have a diameter of from 20 nm to 1 μm. These very small structures are imaged microscopically, the aim being to superpose the associated images congruently. The beams are adjusted by manually setting tilting angles and parallel offset.

SUMMARY OF THE INVENTION

Particularly in the case of high or extremely high resolution microscopy methods such as, for example, STED (compare EP 0 801 759 B1), 4Pi (compare EP 0 491 289 B1), RESOLFT (compare U.S. Pat. No. 7,064,824 B2 and WO 2004/090617 A2), PALM (compare WO 2006/127692 A2) and Upconversion (compare U.S. Pat. No. 6,859,313 B2), the known device and the correspondingly applied method are not suitable or at most conditionally suitable, since the requirements placed there on the accuracy and the mechanical drifts are so stringent that the adjustments—by hand—are excluded, but at least must be repeated at regular intervals, that is to say as early as after a few hours or days of operation.

A beam adjustment corresponding to the above requirements necessitates a special calibration sample, it being necessary to remove the sample actually to be examined. The bead samples used for calibration are difficult to handle since they tend to form agglomerates. Moreover, it is difficult to find the focus. Conventional adjustments are time-consuming and necessitate great skill and know-how on the part of the user. This leads not infrequently in practice to the fact that adjustments can be undertaken only by selected persons with appropriate experience. A further substantial disadvantage of the known adjustment technique is to be seen in that, because of the requisite change of sample, long-term measurements that necessitate adjustment in the meantime are ruled out from the very start, specifically because of the obligatory removal of the sample for the purpose of the adjustment.

In light of the above statements, it is an object of the present invention to configure and develop a device for beam adjustment in an optical beam path, having at least two mutually independent light sources, in particular in a beam path of a preferably high or extremely high resolution microscope in such a way that reliable adjustment is possible with the aid of simple means even during operation of the microscope. A corresponding method is to be specified.

The inventive device is characterized in that a calibration sample with the aid of which the pupil position and/or focal position of the beams can be checked can be brought into and taken out of the illumination beam path. The inventive method achieves the above object by means of the features described herein.

It has been realized in accordance with the invention that it is possible to undertake the beam adjustment independently of the actual use, that is to say, in the case of a high resolution microscope, independently of the examination sample and/or the recording of images. Provided to this end is a very particular calibration sample that can be brought into and taken out of the illumination beam path, that is to say into or out of the common beam path of the beams to be superposed. The calibration sample is used to check the pupil distance and/or focal distance of the superposed beams. The superposition must in this case be performed such that the pupil distance and/or focal distance of the beams corresponds/correspond.

How the calibration sample is brought into and taken out of the illumination beam path is fundamentally of no importance. Linear movements or else rotary movements of an appropriate sample holder are conceivable. It is also conceivable to make a number of calibration samples available via a type of revolver or slide.

The calibration sample is advantageously pivoted into the illumination beam path. A particularly simple mimic can be implemented to this end. Furthermore, it is advantageous when the calibration sample can be brought into the illumination beam path at the site, or in the vicinity of the intermediate image. It is essential in this case that the sample to be examined need not be removed for the calibration, and this, in particular, enables long-term examinations to be carried out.

It may be remarked at this juncture that it is fundamentally a question here of the superposition or uniting of at least two mutually independent light beams. In other words, at least two mutually independent light sources and beams emanating therefrom are provided. The inventive device can equally be used in uniting the light beams from a number of light sources, and is to be correspondingly designed.

It is advantageous with reference to the calibration sample when the latter has a surface structure that can be imaged uniquely. A defined, preferably ordered or symmetrical surface structure can be involved in this case. It is likewise conceivable for the surface structure to be designed in an arbitrary, unordered or asymmetric fashion.

Particularly in the case of use in extremely high resolution microscopes, it is advantageous when the surface of the calibration sample is microstructured. Such an extremely fine structure can be produced, for example, by sandblasting or glass pearl-blasting.

Calibration by means of calibration sample is performed in such a way that the latter is illuminated with the aid of two or more beams that are to be adjusted/superposed, and is appropriately imaged. Spectrally selective detectors can be used to detect the detection light of the beams to be superposed in order, specifically, to obtain an image from the detection light of the respective beam. It is also conceivable that the light sources can be switched on and deactivated individually or sequentially for detecting the detection light of the beams to be superposed. Instead of switching the light sources on and off, it is also possible to use shutters that clear or block or occlude the respective beam path.

As already mentioned previously, the images resulting from the respective beams are to be brought into alignment. To this end, that is to say for the purposes of adjustment, in the case of the superposition of two beams, at least one actuating element is provided for influencing the pupil position and/or focal position of at least one of the beams to be united. The actuating element is correspondingly arranged in the beam path of one of the beams. When a number of actuating elements are being prepared, the latter are arranged in the respective beam paths, which are upstream of the common illumination beam path.

The actuating element is preferably arranged in the pupil of the respective beam path or in the vicinity of the pupil. This is advantageous, in particular, when it aims only to correct an image offset. No beam offset is produced or corrected in the case of the relevant arrangement.

If, by contrast, the aim is to undertake the correction of a beam offset, it is advantageous when the actuating element is arranged in the vicinity of an intermediate image. In order not to image possible instances of contamination, it is particularly advantageous not to place the position of the actuating element exactly in the intermediate image. Other positions for the actuating element are conceivable, in order, specifically, to be able to set both the angle and the position.

In concrete terms, the actuating element can be a mirror that can preferably be rotated or tilted about two axes. Particularly for the purpose of automatic beam adjustment, it is further advantageous when the actuating element, preferably the mirror, can be rotated or moved in a motorized fashion.

The maximum position of a 2D cross correlation can be used in order to determine the offset of the images assigned to the beams that is to be eliminated for the purpose of beam calibration. The detected intensity of the respective beam can serve as measured variable for the offset. It is also conceivable to provide partially reflecting mirrors and/or position-sensitive detectors (PSD, CCD, beam catchers—compare DE 102 33 074 A1) for determining the respective beam position.

The adjustment rule for arriving at the correction values of the actuating elements with the aid of a measured deviation of the beam positions can be yielded directly from the known geometric conditions.

In practice, it is simpler as a rule to determine the response of the system by means of test deflections of the actuating elements. To this end, the deflections can be described vectorially, for example in the case when use is made of two mirrors that can be tilted about two axes, specifically:

$$T = \begin{pmatrix} t_1 \\ t_2 \\ t_3 \\ t_4 \end{pmatrix} = \begin{pmatrix} \text{mirror 1, axis 1} \\ \text{mirror 1, axis 2} \\ \text{mirror 2, axis 1} \\ \text{mirror 2, axis 2} \end{pmatrix},$$

and 4 "unit test deflections" of the form:

$$\begin{pmatrix} 1 \\ 0 \\ 0 \\ 0 \end{pmatrix}, \begin{pmatrix} 0 \\ 1 \\ 0 \\ 0 \end{pmatrix}, \begin{pmatrix} 0 \\ 0 \\ 1 \\ 0 \end{pmatrix}, \begin{pmatrix} 0 \\ 0 \\ 0 \\ 1 \end{pmatrix}$$

are applied.

For each test deflection, a "response vector"

$$X = \begin{pmatrix} x_1 \\ x_2 \\ x_3 \\ x_4 \end{pmatrix} \text{ e.g. } \begin{pmatrix} \text{image offset } x \\ \text{image offset } y \\ \text{beam offset } x \\ \text{beam offset } y \end{pmatrix}$$

is measured, and the response vectors are arranged in columns as a "response matrix"

$$A = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix}$$

such that $A \cdot T = X$ holds for the test deflections.

By inverting the response matrix thus determined, it is then possible to determine the deflections T required for every arbitrary desired image or beam offset X:

$$T = A^{-1} \cdot A \cdot T = A^{-1} \cdot X$$

Nonlinearities in the system response generally require adjustment to be carried out in a number of iterations. It can also be necessary in some instances to determine the system response at a number of positions.

In the present case, moreover, in order to compensate for mechanical play, the target position of the actuating elements is always approached in a fashion coming from the same direction and in the same sequence.

The adjustment accuracy for the image offset which can be attained in tests on the STED design is better than 0.5 μm at the site of the intermediate image (15.5 mm/(zoom 64×512 pixels)), something which corresponds in the case of a 100× objective to an accuracy <5 nm on the sample.

There are various options for refining and developing the teaching of the present invention in an advantageous way. To this end, reference may be made, on the one hand, to the patent claims dependent on Patent Claim 1 and, on the other hand, to the following explanation of a preferred exemplary embodiment of the invention with the aid of the drawing.

Further objects, features and advantages of the present invention will become apparent from the detailed description of preferred embodiments that follows, when considered together with the accompanying figures of drawing.

BRIEF DESCRIPTION OF THE DRAWINGS

Generally preferred refinements and developments are also explained in conjunction with the explanation of the preferred exemplary embodiment of the invention with the aid of the drawing, in which.

DETAILED DESCRIPTION OF THE PREFERRED EMBODIMENTS

Figure 1:
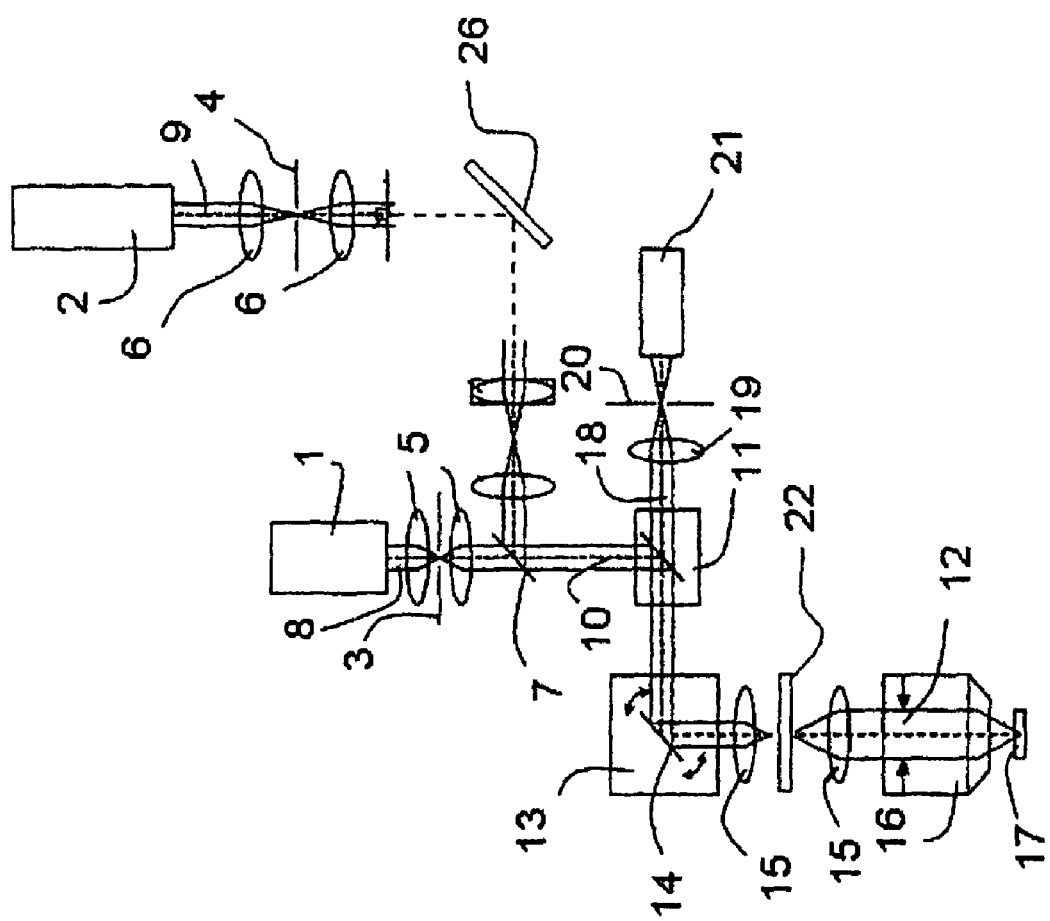
FIG. 1 shows a schematic view of the beam path in a STED microscope having an inventive device, in particular for using the inventive method.

FIG. 1 shows a schematic of the beam path for STED microscopy that incorporates an inventive device.

In the case of the exemplary embodiment selected in FIG. 1, two light sources 1, 2 are provided whose light passes in a conventional way to a beam uniter 7 via an illumination light diaphragm 3, 4 and a lens system 5, 6.

The respective beams 8, 9 are united in the illumination beam path 10 via the beam uniter 7.

Via a further beam splitter/beam uniter 11, the illumination light 12 passes to the sample 17 through an objective 16 via a scanning device 13 with a scanning mirror 14 and via a lens arrangement 15.

The detection light 18 returning from the sample 17 passes to a detector 21 via the scanning mirror 14 and the beam splitter/beam uniter 11 via a lens system 19 and a detection light diaphragm 20, the detector preferably being a spectrally selected detector 21 in this case.

According to the invention, there is provided in the illumination beam path 10 a calibration sample 22 that can be brought into and taken out of said illumination beam path and with the aid of which the pupil position and/or focal position of the beams 8, 9 can be checked.

FIG. 1 clearly shows that the calibration sample 22 has been brought into the illumination beam path 10 at the site of the intermediate image.

Figure 2:
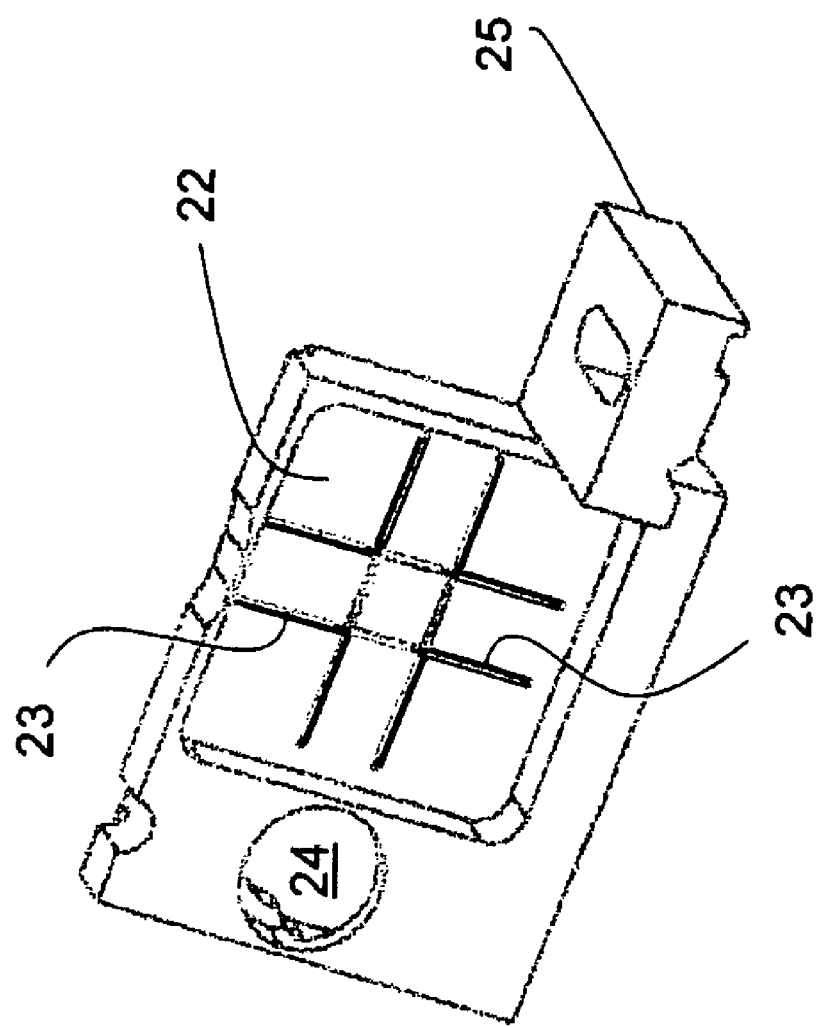
FIG. 2 shows an exemplary embodiment of a calibration sample that can be pivoted into the illumination beam path.

FIG. 2 shows an exemplary embodiment of a possible calibration sample 22 that has a symmetrical surface structure 23. A passage 24 of the calibration sample 22 of plate-like design defines the rotation or pivot axis for an appropriate mode of holding, which axis is not shown here. A stop 25 on the side opposite the rotation axis or the passage 24 serves to delimit the rotary movement, and thus as abutment for the accurately positioned arrangement.

FIG. 2 shows, furthermore, that, given the use of two mutually independent light sources 1, 2, it suffices in the case of the exemplary embodiment selected here when an actuating element 26 is provided only in one beam path 9 in order, specifically, to be able to undertake an adjustment of the beam there. The actuating element 26 serves for influencing the pupil and/or focal position of the beam 9, the actuating element 26 being able to be arranged in the pupil of the beam path or in the vicinity of the pupil or in the vicinity of an intermediate image. The actuating element 26 is designed as a mirror that can be tilted about two axes. The tilting movement of the mirror is performed in a motorized fashion such that automatic adjustment is possible.

Figure 3:
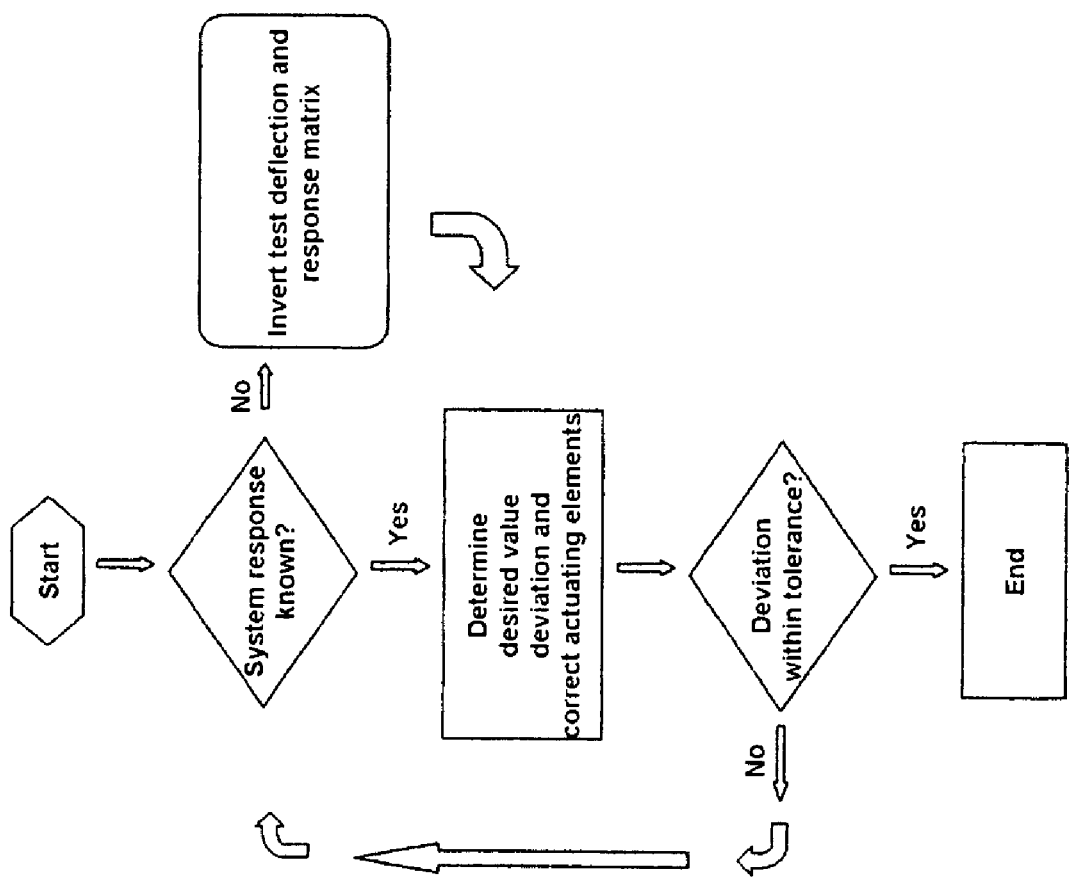
FIG. 3 shows a flowchart for adjustment by means of an actuating element.

FIG. 3 shows a flowchart for adjusting the beam 9 by means of an actuating element 26. The diagram is self-explanatory.

If a deviation of the respective images that lies outside the tolerance is established by using the calibration sample, a calibration is performed, manually or automatically, in accordance with the sequence shown there, doing so by using the adjustment rule set forth in the general part of the description.

Further statements concerning the inventive device, on the one hand, and the inventive method, on the other hand, are superfluous at this juncture with reference to the general part of the description.

It may be pointed out in conclusion that the exemplary embodiment discussed above serves merely to discuss the teaching claimed by way of example, but does not restrict said teaching to the exemplary embodiment—beam path for STED microscopy. The same applies to the method according to the invention.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

| List of reference numerals | |
|---|---|
| 1 | Light source |
| 2 | Light source |
| 3 | Illumination light diaphragm |
| 4 | Illumination light diaphragm |
| 5 | Lens system |
| 6 | Lens system |
| 7 | Beam uniter |
| 8 | Beam, beam path |
| 9 | Beam, beam path |
| 10 | Illumination beam path |
| 11 | Beam splitter/beam uniter |
| 12 | Illumination light |
| 13 | Scanning device |
| 14 | Scanning mirror |
| 15 | Lens arrangement |
| 16 | Objective |
| 17 | Sample |
| 18 | Detection light |
| 19 | Lens system |
| 20 | Detection light diaphragm |
| 21 | Detector |
| 22 | Calibration sample |
| 23 | Surface structure |
| 24 | Passage, rotation axis |
| 25 | Stop (at calibration sample) |
| 26 | Actuating element |

What is claimed is:

1. Device for beam adjustment in an optical beam path, having at least two mutually independent light sources providing respective beams of a high or extremely high resolution microscope, the beams of the light sources superposed in a common illumination beam path, the device comprising:
   a calibration sample with the aid of which at least one of a pupil position or a focal position of the beams is checked based on surface structure of the calibration sample;
   a sample holder arranged to bring the calibration sample into and out of the common illumination beam path at the site or in the vicinity of an intermediate image; and
   at least one actuating element configured to automatically adjust the position of one of the beams relative to another of the beams.

2. Device according to claim 1, wherein the sample holder is configured to pivot the calibration sample into the illumination beam path.

3. Device according to claim 1, wherein the surface structure is designed in an ordered or symmetrical fashion.

4. Device according to claim 1, wherein the surface structure is designed in an arbitrary, unordered or asymmetric fashion.

5. Device according to claim 1, wherein the surface of the calibration sample is microstructured.

6. Device according to claim 1, wherein the surface of the calibration sample is sandblasted or glass pearl-blasted.

7. Device according to claim 1, wherein spectrally selective detectors are provided for detecting detection light of the beams to be superposed.

8. Device according to claim 1, wherein the light sources are configured to be switched on and deactivated individually or sequentially when a detector detects detection light of the superposed beams.

9. Device according to claim 1, wherein the at least one actuating element influences the pupil position and/or focal position of at least one of the beams to be united.

10. Device according to claim 9, wherein the at least one actuating element is arranged in the beam path of the beams to be combined.

11. Device according to claim 9, wherein the at least one actuating element is arranged in the pupil of the beam path or in the vicinity of the pupil.

12. Device according to claim 9, wherein the at least one actuating element is arranged in the vicinity of another intermediate image.

13. Device according to claim 9, wherein the at least one actuating element is arranged in the pupil of the beam path or in the vicinity thereof, or in the vicinity of another intermediate image.

14. Device according to claim 9, wherein the at least one actuating element comprises a mirror configured to be tilted about two axes.

15. Device according to claim 14, wherein the mirror is configured to be moved in a motorized fashion.

16. Device according to claim 1, further comprising: partially reflecting mirrors and/or position-sensitive sensors configured to determine the respective beam position.

17. Method for beam adjustment in an optical beam path, having at least two mutually independent light sources providing respective beams of a high or extremely high resolution microscope, the beams of the light sources being superposed in a common illumination beam path, the method comprising:
  bringing a calibration sample into the common illumination beam path at the site or in the vicinity of an intermediate image;
  checking at least one of a pupil position or a focal position of the beams using the calibration sample based on surface structure of the calibration sample; and
  automatically adjusting the position of one of the beams relative to another of the beams using at least one actuating element.

18. Method according to claim 17, further comprising: determining an offset of images assigned to the beams using the maximum position of a 2D cross correlation.

19. Method according to claim 18, wherein a detected intensity of the beam serves as a measured variable for the offset.

20. Device for beam adjustment in an optical beam path, having at least two mutually independent light sources providing respective beams of a high or extremely high resolution microscope, the beams of the light sources superposed in a common illumination beam path, the device comprising:
  a calibration sample with the aid of which at least one of a pupil position or a focal position of the beams is checked;
  a sample holder arranged to bring the calibration sample into and out of the common illumination beam path at the site or in the vicinity of an intermediate image; and
  at least one actuating element configured to automatically adjust the position of one of the beams relative to another of the beams, wherein the response of the system by test deflections of the at least one actuating element is determined.

21. Method for beam adjustment in an optical beam path, having at least two mutually independent light sources providing respective beams of a high or extremely high resolution microscope, the beams of the light sources being superposed in a common illumination beam path, the method comprising:
  bringing a calibration sample into the common illumination beam path at the site or in the vicinity of an intermediate image;
  checking at least one of a pupil position or a focal position of the beams using the calibration sample;
  automatically adjusting the position of one of the beams relative to another of the beams using at least one actuating element; and
  determining the response of the system by test deflections of the at least one actuating element.

* * * * *